(12) United States Patent
Oda et al.

(10) Patent No.: US 6,825,264 B2
(45) Date of Patent: Nov. 30, 2004

(54) FLAME RETARDANT RESIN COMPOSITION

(75) Inventors: Hiroji Oda, Kurashiki (JP); Kotaro Kuwata, Kurashiki (JP)

(73) Assignees: Asahi Kasei Chemicals Corporation, Tokyo (JP); Wacker-Chemie Gesellschaft mit Beschrankter Haftung, Munich (DE)

( * ) Notice: Subject to any disclaimer, the term of this patent is extended or adjusted under 35 U.S.C. 154(b) by 56 days.

(21) Appl. No.: 10/268,983

(22) Filed: Oct. 11, 2002

(65) Prior Publication Data
US 2003/0109660 A1 Jun. 12, 2003

(30) Foreign Application Priority Data
Oct. 11, 2001 (JP) ........................................ 2001-313442

(51) Int. Cl.$^7$ .............................................. C08L 69/00
(52) U.S. Cl. ...................... 524/537; 524/502; 524/436; 524/429; 524/588; 525/539; 525/461
(58) Field of Search ................. 524/436, 401, 524/400, 268

(56) References Cited

U.S. PATENT DOCUMENTS

| | | | | |
|---|---|---|---|---|
| 5,449,710 A | * | 9/1995 | Umeda et al. | 524/165 |
| 5,693,697 A | * | 12/1997 | Weider et al. | 524/262 |
| 6,001,921 A | * | 12/1999 | Serizawa et al. | 524/506 |
| 6,184,312 B1 | * | 2/2001 | Yamamoto et al. | 525/474 |
| 6,284,824 B1 | * | 9/2001 | Iji et al. | 524/267 |
| 6,326,425 B1 | * | 12/2001 | Itagaki et al. | 524/268 |
| 6,451,906 B1 | * | 9/2002 | Saito et al. | 524/588 |
| 6,509,421 B2 | * | 1/2003 | Itagaki et al. | 525/393 |
| 6,534,576 B2 | * | 3/2003 | Nakanishi et al. | 524/297 |
| 6,541,548 B2 | * | 4/2003 | Weidner et al. | 524/108 |

FOREIGN PATENT DOCUMENTS

| | | | | |
|---|---|---|---|---|
| EP | 1 191 065 A | | 3/2002 | |
| EP | 1 201 715 A | | 5/2002 | |
| JP | 49-107049 | | 10/1974 | |
| JP | 49-107049 A | * | 11/1974 | |
| JP | 6-207092 | * | 7/1994 | ........... C08L/69/00 |
| JP | 6-306265 A | | 11/1994 | |
| JP | 6-306267 A | * | 11/1994 | ........... C08L/69/00 |
| JP | 6-336547 | * | 12/1994 | ........... C08L/69/00 |
| JP | 8-127723 | * | 5/1996 | ......... C08L/101/00 |
| JP | 8-176425 | * | 7/1996 | ........... C08L/69/00 |
| JP | 8-176427 | * | 7/1996 | ........... C08L/69/00 |
| JP | 8-208970 A | * | 8/1996 | ........... C08L/69/00 |
| JP | 11-217494 A | | 8/1999 | |
| JP | 2001-200150 A | | 7/2001 | |
| WO | WO99/40158 A1 | | 8/1999 | |
| WO | WO00/46299 A1 | | 8/2000 | |
| WO | WO 01 38438 A | | 5/2001 | |

* cited by examiner

Primary Examiner—David W. Wu
Assistant Examiner—Rip A. Lee
(74) Attorney, Agent, or Firm—Birch, Stewart, Kolasch & Birch, LLP

(57) ABSTRACT

Disclosed is a flame retardant resin composition comprising: 100 parts by weight of a resin component (A) which is a resin mixture of an aromatic polycarbonate and a styrene polymer, wherein the resin mixture has an aromatic polycarbonate content of from 50 to 95% by weight and a styrene polymer content of from 5 to 50% by weight; 0.1 to 30 parts by weight of an organopolysiloxane (B) which comprises 0 to 70 mol % of a monofunctional siloxane unit (M unit), 0 to 100 mol % of a bifunctional recurring siloxane unit (D unit), 0 to 100 mol % of a trifunctional recurring siloxane unit (T unit), and 0 to 63 mol % of a tetrafunctional recurring siloxane unit (Q unit); and 0.0005 to 5 parts by weight of at least one inorganic metal salt (C) selected from the group consisting of inorganic alkali metal salts and inorganic alkaline earth metal salts.

3 Claims, No Drawings

FLAME RETARDANT RESIN COMPOSITION

BACKGROUND OF THE INVENTION

1. Field of the Invention

The present invention relates to a flame retardant resin composition. More particularly, the present invention is concerned with a flame retardant resin composition comprising a resin component (A) which is a resin mixture of an aromatic polycarbonate and a styrene polymer, an organopolysiloxane (B) and at least one inorganic metal salt (C) selected from the group consisting of inorganic alkali metal salts and inorganic alkaline earth metal salts. In the present invention, by the combined use of an organopolysiloxane and an inorganic metal salt, a resin composition which contains an inherently flammable styrene polymer can be imparted with flame retardancy.

2. Prior Art

Aromatic polycarbonates are known as engineering plastics which have excellent impact resistance, heat resistance and transparency, and have been widely used in various fields, especially in the fields of office automation machines, household electric appliances and data communication equipments. In these fields, there has been a demand for mechanical parts having a small thickness as well as complicated structures. In accordance with such a demand, in order to improve the melt fluidity so as to achieve high injection moldability with respect to an aromatic polycarbonate, it has frequently been practiced to add a styrene resin to an aromatic polycarbonate. As the styrene resin used for this purpose, a rubber-modified styrene resin is generally used from the viewpoint of the desired properties, such as impact resistance, of the resultant aromatic polycarbonate resin composition.

In the fields of those electric/electronic devices which are mentioned above, for assuring the high safety of products, a high level of flame retardancy is required. An aromatic polycarbonate has a limiting oxygen index (which is a criterion for the flame retardancy) of from 26 to 27, and is known as a resin having a self-extinguishing property. The reason for this can be explained as follows. The main chain of the molecule of an aromatic polycarbonate is comprised mainly of aromatic rings. Therefore, when the aromatic polycarbonate is on fire, not only a thermal decomposition reaction but also a rearrangement reaction, a cyclization reaction and a crosslinking reaction occur, thereby easily forming a char layer which has extremely high flame retardancy.

On the contrary, a styrene polymer is a flammable resin having a limiting oxygen index as low as 18 and it is extremely difficult to inhibit the combustion thereof. The reason for this can be explained as follows. A styrene polymer is depolymerized by the combustion, and the resultant monomer acts as a fuel, causing the combustion to continue and also proceed acceleratedly. Consequently, in a resin mixture of an aromatic polycarbonate and a styrene polymer, as the amount of the styrene polymer is increased for improving the moldability, it becomes difficult to achieve high flame retardancy.

As a technique for imparting a high level of flame retardancy to a resin, it is known to incorporate thereinto flame retardants, for example halogen-containing flame retardants and auxiliary flame retardants, such as antimony oxide. However, in recent years, due to the growing interest in the environmental protection, studies have been made on the change of the types of flame retardants to those flame retardants which have higher safety.

For imparting flame retardancy to an aromatic polycarbonate and a resin mixture of an aromatic polycarbonate and a styrene polymer, a phosphate compound is generally employed as a flame retardant. However, a phosphate compound has a problem in that it is susceptible to hydrolysis and thermal decomposition and the resultant phosphoric acid causes a lowering of the molecular weight of the polycarbonate, leading to a lowering of the mechanical properties of the resin composition. Therefore, there arises a demand for a safer and more reliable flame retardant.

An organopolysiloxane is one of the non-halogen flame retardants, which has long been studied for its high safety.

In general, an organopolysiloxane is a polymer comprising recurring units of at least one type of unit selected from the group consisting of the following units:

a monofunctional siloxane unit (M unit) represented by the following formula (1):

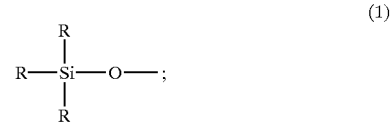

a bifunctional recurring siloxane unit (D unit) represented by the following formula (2):

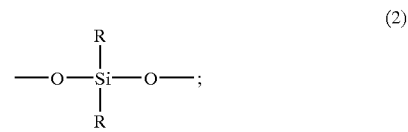

a trifunctional recurring siloxane unit (T unit) represented by the following formula (3):

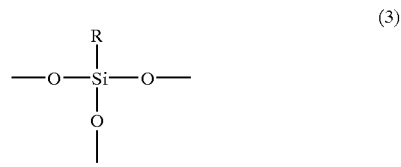

(in formulae (1) to (3), R is a monovalent organic group); and a tetrafunctional recurring siloxane unit (Q unit) represented by the following formula (4):

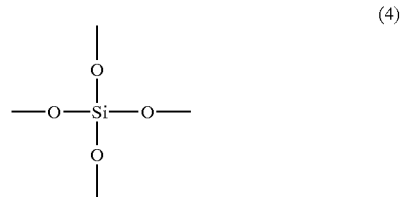

(see "Silicone Handbook", edited by Kunio Ito and published by The Nikkan Kogyo Shinbun Ltd., Japan (1990)).

For example, Unexamined Japanese Patent Application Laid-Open Specification Nos. Hei 10-139964 (corresponding to EP No. 0 829 521) and Hei 11-140294 (corresponding to German Patent No. 19850453) each disclose a technique of improving the flame retardancy of an aromatic polycarbonate by using as a flame retardant a branched organopolysiloxane comprised mainly of a D unit and a T unit and optionally further comprised of a Q unit.

However, the effect of the conventional organopolysiloxane to impart flame retardancy to a resin is unsatisfactory when it is employed solely and, therefore, various studies have been made on the techniques of using the organopolysiloxane in combination with other flame retardants.

Representative examples of flame retardants which are generally used in combination with an organopolysiloxane include organic metal salts, such as a metal salt of an aromatic sulfonic acid and a metal salt of a perfluoroalkane sulfonic acid. Further, for preventing the dripping of flaming particles from a resin when the resin is on fire, a fluorine-containing olefin resin, such as polytetrafluoroethylene is frequently used.

Metal salts of organic sulfonic acids (such as an aromatic sulfonic acid and a perfluoroalkane sulfonic acid), especially alkali metal salts of organic sulfonic acids and alkaline earth metal salts of organic sulfonic acids, exhibit the effect of imparting flame retardancy to an aromatic polycarbonate even when such a metal salt of an organic sulfonic acid is used only in a small amount (specifically not greater than 0.5 part by weight, relative to 100 parts by weight of an aromatic polycarbonate). Therefore, such metal salts of organic sulfonic acids have long been used as a flame retardant (see, for example, Examined Japanese Patent Application Publication Specification Nos. Sho 47-40445, Sho 57-43099 and Sho 57-43100). The flame retarding mechanism of metal salts of organic sulfonic acids is described, for example, in G. Montaudo et al., Journal of Polymer Science, Polymer Chemistry, Vol. 26, p. 2113 (1988). Specifically, the above-mentioned article states that a metal salt of an organic sulfonic acid accelerates the thermal decomposition of an aromatic polycarbonate to thereby promote the formation of a char layer, resulting in imparting flame retardancy to the aromatic polycarbonate.

For example, Unexamined Japanese Patent Application Laid-Open Specification Nos. Hei 6-306265 and Hei 6-336547 (corresponding to U.S. Pat. No. 5,449,710) disclose a method in which an organopolysiloxane comprised mainly of a D unit and an alkali metal salt or alkaline earth metal salt of a perfluoroalkane sulfonic acid are added to an aromatic polycarbonate.

Unexamined Japanese Patent Application Laid-Open Specification Nos. Hei 11-217494 (corresponding to EP No. 1 035 169), 2000-302961 (corresponding to International Application Publication No. WO2000/64976), 2000-226527, and 2001-200150 disclose techniques of incorporating into polycarbonate resins organopolysiloxanes having varied types of branched structures which are comprised mainly of a D unit, a T unit and a Q unit, together with a metal salt of an organic sulfonic acid and a fluorine-containing polymer.

Unexamined Japanese Patent Application Laid-Open Specification Nos. Hei 8-176425, Hei 11-222559 (corresponding to U.S. Pat. No. 6,184,312), Hei 11-263903 and 2001-26704 disclose a technique of using, as a flame retardant for an aromatic polycarbonate, combinations of organopolysiloxanes having varied types of structures and a metal salt of an organic sulfonic acid.

The resins used in all the above-mentioned prior art patent documents are only aromatic polycarbonates. None of the above-mentioned prior art patent documents has any specific description about a flame retardancy-improving effect on a resin mixture of an aromatic polycarbonate and a styrene polymer. As mentioned above, a styrene polymer is a flammable resin, and hence it has conventionally been impossible to impart high flame retardancy to a resin mixture of an aromatic polycarbonate and a styrene polymer.

With respect to a technique wherein a combination of an organopolysiloxane and a metal salt of an organic, sulfonic acid is used as a flame retardant for a resin mixture of an aromatic polycarbonate and a styrene polymer, examples of prior art patent documents which disclose such technique include International Application Publication No. WO99/40158, Unexamined Japanese Patent Application Laid-Open Specification Nos. 2000-159996, 2000-256566 and 2000-345045, International Application Publication No. WO2000/46299, and Unexamined Japanese Patent Application Laid-Open Specification No. 2001-72867. In the Working Examples of these patent documents, in order to realize high flame retardancy of a resin mixture of an aromatic polycarbonate and a styrene polymer, a metal salt of an organic sulfonic acid is used in an amount as large as 1 part by weight, relative to 100 parts by weight of the resin mixture. In this connection, it should be noted that, when such a large amount of a metal salt of an organic sulfonic acid is added to an aromatic polycarbonate, it is possible that the thermal stability of the aromatic polycarbonate becomes low, causing a problem in that, during the melt-kneading and molding of the resultant resin composition, a lowering of the molecular weight of the polycarbonate occurs, leading to a lowering of the mechanical properties of the resin composition. Further, as described below, in the studies of the present inventors it has been found that, when the amount of a metal salt of an organic sulfonic acid which is added to a resin mixture of an aromatic polycarbonate and a styrene polymer is decreased in order to avoid a lowering of the mechanical properties of the resin composition, a problem arises in that flame retardancy improvement is not simply lowered; rather, for the worse, the flammability of the resin composition is promoted.

On the other hand, with respect to a technique wherein a salt other than a metal salt of an organic sulfonic acid is used as a flame retardant for an aromatic polycarbonate, examples of such techniques include a method which uses an alkali metal halide (see, for example, Unexamined Japanese Patent Application Laid-Open Specification Nos. Sho 49-88944, Sho 49-107049, Sho 49-125464 and Sho 50-83448); a method which uses an alkali metal salt or alkaline earth metal salt of sulfurous acid, thiosulfuric acid, dithionous acid or pyrosulfurous acid (see, for example, Unexamined Japanese Patent Application Laid-Open Specification Nos. Sho 52-17557 and Sho 52-17558); and a method which uses a fluorine-containing complex salt, such as sodium hexafluoroaluminate or potassium hexafluorosilicate (see, for example, Japanese Patent Application Laid-Open Specification Nos. Sho 48-43751, Sho 53-88856, Sho 53-96055 and Sho 55-151057). All these methods are intended to impart flame retardancy to an aromatic polycarbonate solely employed, but not to a resin mixture of an aromatic polycarbonate and a styrene polymer. Further, it is noted that there has been no conventional technique wherein a salt other than a metal salt of an organic sulfonic acid is used in combination with an organopolysiloxane.

SUMMARY OF THE INVENTION

In this situation, the present inventors have made extensive and intensive studies with a view toward developing an aromatic polycarbonate resin composition which contains an inherently flammable styrene polymer as a part of its resin component, wherein the resin composition exhibits high flame retardancy in spite of the presence of the styrene polymer. As a result, it has been found that high flame retardancy can be imparted to a resin mixture of an aromatic polycarbonate and a styrene polymer by using a flame retardant comprising, in combination, an organopolysiloxane (having high safety) and at least one inorganic metal salt selected from the group consisting of inorganic alkali metal salts and inorganic alkaline earth metal salts, and that, in addition, high flame retardancy can be obtained even when such flame retardant is used only in a very small amount, as compared to the case where a conventional flame retardant is used which comprises a combination of an organopolysiloxane and a metal salt of an organic sulfonic acid. The present invention has been completed, based this novel finding.

Accordingly, a primary object of the present invention is to provide an aromatic polycarbonate resin composition which contains a styrene polymer (which inherently has high flammability) as a part of its resin component, wherein the resin composition exhibits high flame retardancy in spite of the presence of the styrene polymer.

The foregoing and other objects, features and advantages of the present invention will be apparent to those skilled in the art from the following description and appended claims.

DETAILED DESCRIPTION OF THE INVENTION

According to the present invention, there is provided a flame retardant resin composition comprising:

100 parts by weight of a resin component (A) which is a resin mixture of an aromatic polycarbonate and a styrene polymer, wherein the resin mixture has an aromatic polycarbonate content of from 50 to 95% by weight and a styrene polymer content of from 5 to 50% by weight, 0.1 to 30 parts by weight of an organopolysiloxane (B), and 0.0005 to 5 parts by weight of at least one inorganic metal salt (C) selected from the group consisting of inorganic alkali metal salts and inorganic alkaline earth metal salts, the organopolysiloxane (B) comprising:

0 to 70 mol % of a monofunctional siloxane unit (M unit) represented by the following formula (1):

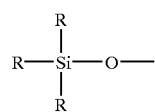

(1)

wherein each R independently represents a monovalent organic group selected from the group consisting of a monovalent $C_1$–$C_{20}$ hydrocarbon group, a monovalent $C_1$–$C_{20}$ halogenated hydrocarbon group, a $C_1$–$C_{20}$ mercaptoalkyl group, a $C_2$–$C_{20}$ cyanoalkyl group, a $C_2$–$C_{20}$ acyloxyalkyl group, a $C_1$–$C_{20}$ aminoalkyl group, a $C_6$–$C_{20}$ aminoaryl group, a $C_1$–$C_{20}$ hydroxyalkyl group, and a $C_4$–$C_{20}$ glycidoxyalkyl group;

0 to 100 mol % of a bifunctional recurring siloxane unit (D unit) represented by the following formula (2):

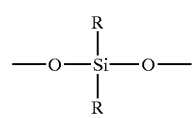

(2)

wherein each R is as defined above for formula (1);

0 to 100 mol % of a trifunctional recurring siloxane unit (T unit) represented by the following formula (3):

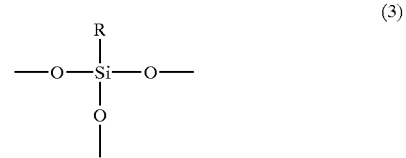

(3)

wherein R is as defined above for formula (1); and 0 to 63 mol % of a tetrafunctional recurring siloxane unit (Q unit) represented by the following formula (4):

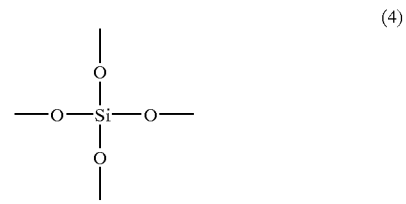

(4)

wherein each mol % is based on the total molar amount of the M unit, the D unit, the T unit and the Q unit.

For easy understanding of the present invention, the essential features and various preferred embodiments of the present invention are enumerated below.

1. A flame retardant resin composition comprising:

100 parts by weight of a resin component (A) which is a resin mixture of an aromatic polycarbonate and a styrene polymer, wherein the resin mixture has an aromatic polycarbonate content of from 50 to 95% by weight and a styrene polymer content of from 5 to 50% by weight, 0.1 to 30 parts by weight of an organopolysiloxane (B), and 0.0005 to 5 parts by weight of at least one inorganic metal salt (C) selected from the group consisting of inorganic alkali metal salts and inorganic alkaline earth metal salts, the organopolysiloxane (B) comprising:

0 to 70 mol % of a monofunctional siloxane unit (M unit) represented by the following formula (1):

(1)

wherein each R independently represents a monovalent organic group selected from the group consisting of a monovalent $C_1$–$C_{20}$ hydrocarbon group, a monovalent $C_1$–$C_{20}$ halogenated hydrocarbon group, a $C_1$–$C_{20}$ mercaptoalkyl group, a $C_2$–$C_{20}$ cyanoalkyl group, a $C_2$–$C_{20}$ acyloxyalkyl group, a $C_1$–$C_{20}$ aminoalkyl group, a $C_6$–$C_{20}$ aminoaryl group, a $C_1$–$C_{20}$ hydroxyalkyl group, and a $C_4$–$C_{20}$ glycidoxyalkyl group;

0 to 100 mol % of a bifunctional recurring siloxane unit (D unit) represented by the following formula (2):

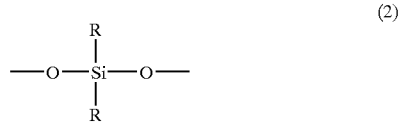

wherein each R is as defined above for formula (1);
0 to 100 mol % of a trifunctional recurring siloxane unit (T unit) represented by the following formula (3):

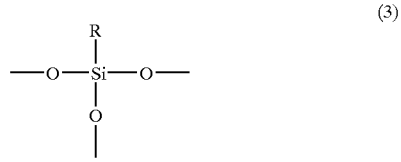

wherein R is as defined above for formula (1); and
0 to 63 mol % of a tetrafunctional recurring siloxane unit (Q unit) represented by the following formula (4):

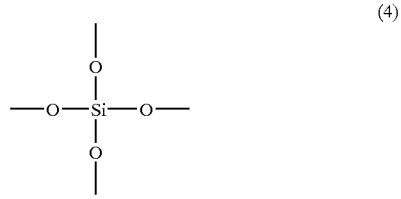

wherein each mol % is based on the total molar amount of the M unit, the D unit, the T unit and the Q unit.

2. The composition according to item 1 above, wherein each R in the formulae (1), (2) and (3) is independently selected from the group consisting of a methyl group, an ethyl group, an n-propyl group, an isopropyl group, an isooctyl group, a vinyl group and a phenyl group.

3. The composition according to item 1 or 2 above, wherein the inorganic metal salt (C) is at least one compound selected from the group consisting of an alkali metal salt of nitric acid, an alkaline earth metal salt of nitric acid, an alkali metal halide and an alkaline earth metal halide.

4. The composition according to item 3 above, wherein the alkali metal halide is at least one compound selected from the group consisting of NaCl, KCl, NaBr and KBr.

Hereinbelow, the present invention is described in detail.

Resin component (A) used in the present invention is a resin mixture of an aromatic polycarbonate and a styrene polymer.

In the present invention, the aromatic polycarbonate contained in the resin component (A) is an aromatic polycarbonate having a main chain comprising recurring units represented by the following formula (5):

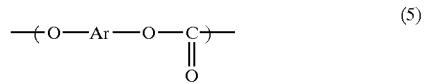

(wherein Ar is a residue of a bifunctional phenolic compound).

Such an aromatic polycarbonate can be produced, for example, by a reaction between a bifunctional phenolic compound and a carbonate precursor or a polymerization reaction of a carbonate prepolymer.

Illustratively stated, examples of methods for producing aromatic polycarbonates include an interfacial polymerization method (i.e., a phosgene method) in which a bifunctional phenolic compound is reacted with phosgene in the presence of an aqueous sodium hydroxide solution and methylene chloride as a solvent; a transesterification method (i.e., melt transesterification) in which a bifunctional phenolic compound and diphenyl carbonate are subjected to transesterification; and a solid-phase polymerization method in which a crystallized carbonate prepolymer is used.

Examples of bifunctional phenolic compounds include 2,2-bis(4-hydroxyphenyl)propane (i.e., bisphenol A), 2,2-bis(4-hydroxy-3,5-dimethylphenyl)propane, 1,1-bis(4-hydroxyphenyl)ethane, bis(4-hydroxyphenyl)methane, 4,4'-dihydroxydiphenyl, 4,4'-dihydroxy-3,3',5,5'-tetramethyldiphenyl, 1,1-bis(4-hydroxyphenyl)cyclohexane, 1-phenyl-1,1-bis(4-hydroxyphenyl)ethane, bis(4-hydroxyphenyl)ether, bis(4-hydroxyphenyl)ketone, bis(4-hydroxyphenyl)sulfide, bis(4-hydroxyphenyl)sulfone, bis(4-hydroxyphenyl)sulfoxide, hydroquinone, resorcinol and catechol. 2,2-bis(4-hydroxyphenyl)propane (i.e., bisphenol A) is particularly preferred. In the present invention, these bifunctional phenolic compounds can be used individually or in combination.

For adjusting the molecular weight of the aromatic polycarbonate, the polymerization reaction for producing the aromatic polycarbonate can be conducted in the presence of a monofunctional phenolic compound, such as phenol, p-methylphenol, m-methylphenol, p-propylphenol, m-propylphenol, p-t-butylphenol, p-t-octylphenol or p-cumylphenol.

In addition, the aromatic polycarbonate used in the present invention may have a branched structure. A branched aromatic polycarbonate can be produced by substantially the same method as described above in connection with the non-branched aromatic polycarbonate except that the polymerization reaction is conducted in the presence of a branching agent.

Examples of branching agents include 1,1,1-tris(4-hydroxyphenyl)ethane, 1,3,5-tris(4-hydroxyphenyl)benzene, α,α',α"-tris(4-hydroxyphenyl)-1,3,5-triisopropylbenzene, phloroglucin, 4,6-dimethyl-2,4,6-tris(4-hydroxyphenyl)-2-heptene, 4,6-dimethyl-2,4,6-tris(4-hydroxyphenyl)heptane and isatin bisphenol (i.e., 3,3-bis(4-hydroxyphenyl)oxyindol).

It is preferred that the aromatic polycarbonate used in the present invention is an aromatic polycarbonate containing substantially no halogens in the structure thereof. From the viewpoint of mechanical strength and moldability, the viscosity average molecular weight of the aromatic polycarbonate is preferably in the range of from 10,000 to 100,000, more preferably in the range of from 14,000 to 40,000. The viscosity average molecular weight of an aromatic polycarbonate can be determined from the solution viscosity (using methylene chloride as a solvent) of the aromatic polycarbonate.

In the present invention, the styrene polymer contained in resin component (A) is a rubber-modified styrene polymer and/or a non-rubber-modified styrene polymer, and it is preferred to use a rubber-modified styrene polymer alone or a mixture of a rubber-modified styrene polymer and a non-rubber-modified styrene polymer.

A rubber-modified styrene polymer is a polymer having a structure in which a dispersed phase comprised of a particulate rubber polymer for modification is dispersed in a continuous phase comprised of a styrene polymer. A rubber-modified styrene polymer can be obtained by graft-polymerizing an aromatic vinyl monomer (such as styrene, α-methylstyrene or p-methylstyrene) and optionally a comonomer copolymerizable with the aromatic vinyl comonomer, on a rubber polymer for modification, using a customary method, such as a bulk polymerization method, an emulsion polymerization method or a suspension polymerization method.

Examples of suitable rubber polymers for modification include diene rubbers, such as polybutadiene, poly(styrene-butadiene) and poly(acrylonitrile-butadiene); an isoprene rubber; a chloroprene rubber; acrylic rubbers, such as polybutyl acrylate; an ethylene/propylene/diene terpolymer (EPDM); an ethylene/octene copolymer rubber; and a composite rubber comprising a organopolysiloxane component and an alkyl (meth)acrylate component (a silicone-acrylic composite rubber).

Examples of comonomers copolymerizable with the aromatic vinyl monomer include unsaturated nitrile monomers, such as acrylonitrile and methacrylonitrile; vinyl monomers, such as acrylic acid, methacrylic acid, an alkyl acrylate and an alkyl methacrylate; maleic anhydride; and an N-substituted maleimide.

In the present invention, the content of the modifyer rubber polymer in the rubber-modified styrene polymer is preferably in the range of from 5 to 80% by weight, more preferably from 10 to 60% by weight. When the content of the rubber polymer in the rubber-modified styrene polymer is less than 5% by weight, the impact resistance of the resin composition becomes unsatisfactory. When the content of the rubber polymer in the rubber-modified styrene polymer is more than 80% by weight, the resin composition suffers not only a lowering of heat stability as well as stiffness, but also a lowering of melt fluidity and an occurrence of discoloration as well as gelation. The average diameter of the rubber polymer particles in the rubber-modified styrene polymer is preferably from 0.1 to 2.0 μm, more preferably from 0.1 to 1.0 μm, still more preferably from 0.2 to 0.6 μm. When the average diameter of the rubber polymer particles is less than 0.1 μm, the improvement in impact resistance of the resin composition is unsatisfactory. When the average diameter of the rubber polymer particles exceeds 2.0 μm, the melt fluidity of the resin composition and the appearance of an ultimate shaped article produced from the resin composition become poor.

Preferred examples of rubber-modified styrene polymers include the so-called high impact polystyrene (hereinafter, frequently referred to as "HIPS"), acrylonitrile/butadiene/styrene copolymer (ABS resin), acrylonitrile/acrylic rubber/styrene copolymer (AAS resin), acrylonitrile/ethylene-propylene rubber/styrene copolymer (AES resin) and methyl methacrylate/butadiene/styrene copolymer (MBS resin). Further, a composite rubber graft copolymer obtained by grafting the above-mentioned vinyl monomer onto a silicone-acrylic composite rubber can be used as a rubber-modified styrene polymer.

A non-rubber-modified styrene polymer is a polymer obtained by substantially the same method as described above in connection with the rubber-modified styrene polymer except that a rubber polymer is not used. That is, a non-rubber-modified styrene polymer can be obtained by polymerizing or copolymerizing an aromatic vinyl monomer (such as styrene, α-methylstyrene or p-methylstyrene) and optionally an unsaturated nitrile monomer (such as acrylonitrile or methacrylonitrile) or other monomers (such as, vinyl monomers, e.g., acrylic acid, methacrylic acid, an alkyl acrylate and an alkyl methacrylate; and maleic anhydride and an N-substituted maleimide). Examples of non-rubber-modified styrene polymers include general purpose polystyrene (GPPS), acrylonitrile/styrene copolymer (AS resin) and butyl acrylate/acrylonitrile/styrene copolymer resin (BAAS).

With respect to the styrene polymer used in the present invention, the reduced viscosity $\eta_{sp}/C$ (as measured in a 0.005 g/cm3 polymer solution at 30° C.), which is an index of the molecular weight, is preferably in the range of from 30 to 80 cm$^3$/g, more preferably from 40 to 60 cm$^3$/g, wherein, when the styrene polymer is a polystyrene resin, toluene is used as the solvent and when the styrene polymer is an unsaturated nitrile/aromatic vinyl copolymer, methyl ethyl ketone is used as the solvent. In the production of the styrene polymer, the reduced viscosity $\eta_{sp}/C$ can be controlled by selecting the type and amount of the initiator, the polymerization temperature and the amount of the chain transfer agent.

The resin mixture used as resin component (A) has an aromatic polycarbonate content of from 50 to 95% by weight, preferably from 65 to 95% by weight, more preferably from 75 to 90% by weight, that is, the styrene polymer content of the resin mixture is from 50 to 5% by weight, preferably from 35 to 5% by weight, more preferably from 25 to 10% by weight. When the aromatic polycarbonate content is less than 50% by weight, the heat resistance, mechanical strength and flame retardancy of the ultimate shaped article become unsatisfactory. When the styrene polymer content is less than 5% by weight, the improvement in moldability of the resin composition becomes unsatisfactory.

The organopolysiloxane used as component (B) in the present invention is one of the components which play an important role for imparting flame retardancy to resin component (A).

The organopolysiloxane (B) used in the present invention comprises: 0 to 70 mol % of the above-mentioned monofunctional siloxane unit (hereinafter referred to as "M unit"), 0 to 100 mol % of the above-mentioned bifunctional recurring siloxane unit (hereinafter referred to as "D unit"), 0 to 100 mol % of the above-mentioned trifunctional recurring siloxane unit (hereinafter referred to as "T unit") and 0 to 63 mol % of the above-mentioned tetrafunctional recurring siloxane unit (hereinafter referred to as "Q unit"), wherein each mol % is based on the total molar amount of the M unit, the D unit, the T unit and the Q unit.

Preferably, the organopolysiloxane (B) comprises 0 to 50 mol % of an M unit, 0 to 100 mol % of a D unit, 0 to 90 mol % of a T unit and 0 to 60 mol % of a Q unit, wherein each mol % is based on the total molar amount of the M unit, the D unit, the T unit and the Q unit.

The molar ratio (mol %) of each of the M unit, D unit, T unit and Q unit and the structure of the siloxane units contained can be confirmed by proton and silicon 29 nuclear magnetic resonance ($^1$H— and $^{29}$Si-NMR) spectroscopy.

The M unit is a terminal group-forming unit. When the amount of the M unit exceeds 70 mol %, the molecular weight of the organopolysiloxane becomes too low, and this results in that the volatility of the organopolysiloxane becomes too high and the compatibility of the organopolysiloxane with resin component (A) becomes too high and, therefore, resin component (A) becomes plasticized. As a result, the flame retardancy of the resin composition becomes disadvantageously lowered.

The Q unit is a crosslinkage-forming unit. When the amount of the Q unit exceeds 63 mol %, a problem arises in that a gelation occurs during the production of the organopolysiloxane or that the molecular weight of the organopolysiloxane becomes too high, so that the dispersibility of the organopolysiloxane in resin component (A) is lowered, leading to a lowering of the flame retardancy imparting effect of the organopolysiloxane.

With respect to the D unit content and T unit content of organopolysiloxane (B), there is no particular limitation, and these units can be contained in any desired proportions in organopolysiloxane (B).

Each R in the M unit, D unit and T unit of organopolysiloxane (B) independently represents a monovalent organic group selected from the group consisting of a monovalent $C_1$–$C_{20}$ hydrocarbon group, a monovalent $C_1$–$C_{20}$ halogenated hydrocarbon group, a $C_1$–$C_{20}$ mercaptoalkyl group, a $C_2$–$C_{20}$ cyanoalkyl group, a $C_2$–$C_{20}$ acyloxyalkyl group, a $C_1$–$C_{20}$ aminoalkyl group, a $C_6$–$C_{20}$ aminoaryl group, a $C_1$–$C_{20}$ hydroxyalkyl group, and a $C_4$–$C_{20}$ glycidoxyalkyl group.

Examples of hydrocarbon groups include an alkyl group, such as a methyl group, an ethyl group, an n-propyl group, an isopropyl group, an n-butyl group, an isobutyl group, an s-butyl group, a t-butyl group, an n-pentyl group, an isopentyl group, a neopentyl group, a t-pentyl group, an n-hexyl group, an n-heptyl group, an n-octyl group, an isooctyl group, an n-nonyl group, an n-decyl group, an n-dodecyl group or an n-octadecyl group; an alkenyl group, such as a vinyl group, an allyl group, a 5-hexenyl group or a 4-vinylcyclohexyl group; a cycloalkyl group, such as a cyclopentyl group, a cyclohexyl group, a 4-ethylcyclohexyl group or a cycloheptyl group; an aryl group, such as a phenyl group, a biphenyl group, a naphthyl group, a tolyl group, a xylyl group or an ethylphenyl group; and an aralkyl group, such as a benzyl group, an α-phenylethyl group or a β-phenylethyl group.

Examples of halogenated hydrocarbon groups include a chloromethyl group, a 3-chloropropyl group, a 3,3,3-trifluoropropyl group, a 5,5,5,4,4,3,3-heptafluoropentyl group, a chlorophenyl group, a dichlorophenyl group and a trifluorotolyl group.

Examples of mercaptoalkyl groups include a 2-mercaptoethyl group and a 3-mercaptopropyl group.

Examples of cyanoalkyl groups include a 2-cyano-ethyl group and a 3-cyanopropyl group.

Examples of acyloxyalkyl groups include a 3-acryloxypropyl group and a 3-methacryloxypropyl group.

Examples of aminoalkyl groups include a 3-amino-propyl group, an N-(2-aminoethyl)-3-aminopropyl group, and an N-(2-aminoethyl)-3-amino-(2-methyl)-propyl group.

Examples of aminoaryl groups include an amino-phenyl group.

Examples of hydroxyalkyl groups include a hydroxypropyl group.

Examples of glycidoxyalkyl groups include a 3-glycidoxypropyl group.

Among these groups, from the viewpoint of excellent properties and economical advantages, it is most preferred that each R in the M unit, D unit and T unit of organopolysiloxane (B) independently represents an organic group selected from the group consisting of a methyl group, an ethyl group, an n-propyl group, an isopropyl group, an isooctyl group, a vinyl group and a phenyl group.

With respect to the structure of organopolysiloxane (B), there is no particular limitation as long as the contents of M unit, D unit, T unit and Q unit are, respectively, in the above mentioned ranges. Therefore, various types of organopolysiloxanes can be used in the present invention. Examples of the structures of organopolysiloxane (B) include a linear or cyclic structure comprising D units, a branched structure comprising T units, and a branched structure comprising a combination DT, DQ, TQ or DTQ (wherein, for example, DT means a combination of D unit and T unit; and similar abbreviations are frequently used hereinafter). Further, examples of structures having terminal M units include a linear structure comprising a combination MD, and a branched structure comprising a combination MT, MQ, MDT, MDQ, MTQ or MDTQ. Preferred are an organopolysiloxane having a linear structure comprising a combination MD and an organopolysiloxane having a branched structure comprising a combination DT, MDT, MQ, MDQ, MTQ or MDTQ. Especially preferred organopolysiloxane (B) is the so-called MQ resin which is an organopolysiloxane composed mainly of M units and Q units and optionally containing D units and/or T units. Such an organopolysiloxane can be advantageously produced by, for example, the methods disclosed in Examined Japanese Patent Application Publication No. Hei 8-22921 (corresponding to U.S. Pat. No. 5,548,053) and Japanese Patent No. 2941701 (corresponding to U.S. Pat. No. 5,786,413).

The preferred structures of organopolysiloxane (B) can be expressed in terms of its composition. When organopolysiloxane (B) is composed mainly of D units and T units, it is preferred that the total content of D unit and T unit is in the range of from 70 to 100 mol % and the M unit content is in the range of from 0 to 30 mol %, wherein it is more advantageous that the molar ratio of the D unit to the T unit is in the range of from 10/90 to 90/10.

When organopolysiloxane (B) is composed mainly of M units and Q units, it is preferred that the M unit content is in the range of from 10 to 50 mol %, the Q unit content is in the range of from 15 to 60 mol %, and the total content of D unit and T unit is in the range of from 0 to 70 mol %, more advantageously from 5 to 70 mol %.

Organopolysiloxane (B) comprising D unit, T unit and Q unit contains, as a terminal group, a hydroxyl group and/or an alkoxy group which are/is directly bonded to the silicon atom, depending on the production method. The alkyl group in the alkoxy group varies depending on the starting material or solvent used in the production process and it is generally a lower alkyl group, such as a methyl group, an ethyl group, a propyl group, a butyl group, a pentyl group or a hexyl group.

These terminal groups (especially terminal hydroxyl group) are highly reactive and therefore it is not preferred that they are present in a large amount in organopolysiloxane (B). This is because these terminal groups cause a side reaction in which, when the organopolysiloxane is hydrolyzed, these terminal groups form crosslinking, thereby causing a lowering of the moldability of the resin composition, or in which, when the organopolysiloxane is mixed with the resin component at a high temperature, these terminal groups react with an aromatic polycarbonate, thereby causing a lowering of the molecular weight of the aromatic polycarbonate.

It is preferred that the terminal hydroxyl group content of organopolysiloxane (B) is 5% by weight or less, more advantageously 1% by weight or less. It is preferred that the terminal alkoxy group content of organopolysiloxane (B) is 10% by weight or less, more advantageously 5% by weight or less.

The hydroxyl group content can be determined by a method in which the amount of gas which is generated when organopolysiloxane (B) is reacted with an organo-metallic compound, such as an alkyllithium, an alkyl-magnesium halide (Grignard reagent) or the like, in an anhydrous solvent is measured. On the other hand, the alkoxy group content can be calculated, for example from the signal integral ratio of the proton nuclear magnetic resonance ($^1$H-NMR) spectrum using an appropriate internal standard substance.

Organopolysiloxane (B) can be stabilized by a method in which the terminal hydroxyl groups are treated with a silylating agent to thereby convert the terminal hydroxyl groups into M units.

The introduction of an M unit into the skeleton of organopolysiloxane (B) can be conducted not only by the silylation treatment conducted after the below-mentioned hydrolysis-condensation polymerization reaction (for producing organopolysiloxane (B)), but also during the hydrolysis-condensation polymerization reaction (for producing organopolysiloxane (B)).

Specific examples of organochlorosilanes, organoalkoxysilanes and other raw materials used for producing organopolysiloxane (B) are described below.

Examples of raw materials for the D unit include dimethyldichlorosilane, diethyldichlorosilane, methylvinyldichlorosilane, methylphenyldichlorosilane, diphenyldichlorosilane, dimethyldimethoxysilane, dimethyldiethoxysilane, diethyldimethoxysilane, diethyldiethoxysilane, methylvinyldimethoxysilane, methylvinyldiethoxysilane, methylphenyldimethoxysilane, methylphenyldiethoxysilane, diphenyldimethoxysilane, and diphenyldiethoxysilane.

Examples of other raw materials for the D unit include hexamethylcyclotrisiloxane, octamethylcyclotetrasiloxane, decamethylcyclopentasiloxane, 1,3,5-trimethyl-1,3,5-triphenylcyclotrisiloxane, 1,3,5,7-tetramethyl-1,3,5,7-tetraphenylcyclotetrasiloxane, hexaphenylcyclotrisiloxane and octaphenylcyclotetrasiloxane.

Examples of raw materials for the T unit include methyltrichlorosilane, ethyltrichlorosilane, vinyltrichlorosilane, n-propyltrichlorosilane, isopropyltrichlorosilane, phenyltrichlorosilane, isooctyltrichlorosilane, methyltrimethoxysilane, methyltriethoxysilane, ethyltrimethoxysilane, ethyltriethoxysilane, vinyltrimethoxysilane, vinyltriethoxysilane, n-propyltrimethoxysilane, n-propyltriethoxysilane, isopropyltrimethoxysilane, isopropyltriethoxysilane, phenyltrimethoxysilane, phenyltriethoxysilane, isooctyltrimethoxysilane and isooctyltriethoxysilane.

Examples of raw materials for the Q unit include tetrachlorosilane, tetramethoxysilane, tetraethoxysilane and tetra-n-propoxysilane.

Examples of silylating agents used for introducing the M unit include chlorosilanes, such as trimethylchlorosilane, triethylchlorosilane, dimethylphenylchlorosilane, diphenylmethylchlorosilane, triphenylchlorosilane and dimethylvinylchlorosilane; and disilazanes, such as hexamethyldisilazane and 1,3-divinyltetramethyldisilazane.

Examples of raw materials for the M unit, other than the above-mentioned silylating agents, include hexamethyldisiloxane, 1,3-diphenyltetramethyldisiloxane and 1,3-divinyltetramethyldisiloxane.

Organopolysiloxane (B) used in the present invention preferably has a weight average molecular weight of from 500 to 100,000, more preferably from 1,000 to 40,000, still more preferably from 1,000 to 10,000. When the weight average molecular weight is less than 500, the volatility of organopolysiloxane (B) becomes too high and the compatibility with resin component (A) becomes too high and, therefore, resin component (A) becomes plasticized. As a result, the flame retardancy of the resin composition becomes disadvantageously lowered. On the contrary, when the weight average molecular weight exceeds 100,000, the dispersibility of organopolysiloxane (B) in resin component (A) is lowered. As a result, the flame retardancy of the resin composition becomes unsatisfactory and the mechanical properties of the resin composition are lowered disadvantageously. The weight average molecular weight of organopolysiloxane (B) is obtained by gel permeation chromatography (GPC), using a calibration curve obtained with respect to standard monodisperse polystyrene samples.

With respect to the method for producing organopolysiloxane (B), there is no particular limitation, and any conventional methods can be employed. For example, an organopolysiloxane can be produced by subjecting an organochlorosilane, an organoalkoxysilane or the like to a hydrolysis-condensation polymerization reaction in the presence of an excess amount of water and an acidic or basic catalyst, followed by neutralization of the acidic or basic catalyst with a base or acid. Organopolysiloxane (B) having a desired structure can be obtained by controlling the contents of M units, D units, T units and Q units by appropriately selecting the type and amount of the organochlorosilane, organoalkoxysilane or the like. Further, the molecular weight of the organopolysiloxane (B) can be controlled by adjusting the type and amount of the catalyst, the amount of water, the temperature and time of the hydrolysis-condensation polymerization reaction and the content of M units.

In the conventional methods for producing an organopolysiloxane, an organopolysiloxane produced is subjected to purification treatment for removing by-produced salts, i.e., salts formed between an acidic or basic catalyst and a base or acid used for neutralization of the acidic or basic catalyst. Also in the present invention, an organopolysiloxane produced may be subjected to such purification treatment. However, the by-produced salts include inorganic metal salts usable as component (C). Therefore, as described below in connection with the method for incorporating inorganic metal salt (C), it is preferred that the purification treatment is omitted and the inorganic metal salts by-produced in the organopolysiloxane produced are used as component (C).

The amount of organopolysiloxane (B) used in the resin composition is from 0.1 to 30 parts by weight, preferably from 0.5 to 20 parts by weight, more preferably from 1 to 15 parts by weight, relative to 100 parts by weight of resin component (A). When the amount of organopolysiloxane (B) is less than 0.1 part by weight, the improvement in flame retardancy of the resin composition becomes unsatisfactory. On the other hand, when the amount of organopolysiloxane (B) is more than 30 parts by weight, the mechanical properties, such as impact resistance, of the resin composition disadvantageously become low. Organopolysiloxanes (B) can be used individually or in combination.

An inorganic alkali metal salt and/or an inorganic alkaline earth metal salt are/is used as inorganic metal salt (C). The inorganic metal salt (C) is the component which is the characteristic feature of the present invention and which plays an important role for imparting flame retardancy to resin component (A) by a synergistic effect achieved by the cooperation between inorganic metal salt (C) and organopolysiloxane (B).

The inorganic alkali metal salt and inorganic alkaline earth metal salt, which are used as inorganic metal salt (C), are, respectively, a salt formed between an inorganic acid and an alkali metal element and a salt formed between an inorganic acid and an alkaline earth metal element.

The alkali metal elements used for producing inorganic metal salt (C) are lithium, sodium, potassium, rubidium and cesium. Of them, sodium and potassium are preferred.

The alkaline earth metal elements used for producing inorganic metal salt (C) are beryllium, magnesium, calcium, strontium and barium. Of them, magnesium and calcium are preferred.

Examples of inorganic acids used for producing inorganic metal salt (C) include hydrogen fluoride, hydrogen chloride, hydrogen bromide, hydrogen iodide, sulfuric acid, sulfurous acid, thiosulfuric acid, pyrosulfurous acid, dithinous acid, nitric acid, nitrous acid, phosphoric acid, pyrophosphoric acid, boric acid, hexafluoroaluminic acid, hexafluorosilicic acid, hexafluorotitanic acid, hexafluorophosphoric acid and tetrafluoroboric acid.

Preferred examples of inorganic metal salt (C) include an alkali metal salt of nitric acid, an alkaline earth metal salt of nitric acid, an alkali metal halide and an alkaline earth metal halide. The alkali metal halide is formed between an alkali metal element and hydrogen fluoride, hydrogen chloride, hydrogen bromide or hydrogen iodide. The alkaline earth metal halide is formed between an alkaline earth metal element and hydrogen fluoride, hydrogen chloride, hydrogen bromide or hydrogen iodide.

Specific examples of alkali metal halides include LiF, LiCl, LiBr, LiI, NaF, NaCl, NaBr, NaI, KF, KCl, KBr and KI. Of them, NaCl, NaBr, KCl and KBr are preferred.

Specific examples of alkaline earth metal halides include $MgF_2$, $MgCl_2$, $MgBr_2$, $MgI_2$, $CaF_2$, $CaCl_2$, $CaBr_2$ and $CaI_2$.

Specific examples of other inorganic metal salts (C) include $Na_2SO_4$, $K_2SO_4$, $MgSO_4$, $CaSO_4$, $Na_2SO_3$, $K_2SO_3$, $MgSO_3$, $CaSO_3$, $Na_2S_2O_3$, $K_2S_2O_3$, $MgS_2O_3$, $CaS_2O_3$, $Na_2S_2O_5$, $K_2S_2O_5$, $MgS_2O_5$, $CaS_2O_5$, $Na_2S_2O_4$, $K_2S_2O_4$, $MgS_2O_4$, $CaS_2O_4$, $NaNO_3$, $KNO_3$, $Mg(NO_3)_2$, $Ca(NO_3)_2$, $NaNO_2$, $KNO_2$, $Mg(NO_2)_2$, $Ca(NO_2)_2$, $Na_3PO_4$, $K_3PO_4$, $Mg_3(PO_4)_2$, $Ca_3(PO_4)_2$, $Na_4P_2O_7$, $K_4P_2O_7$, $Mg_2P_2O_7$, $Ca_2P_2O_7$, $Na_2B_4O_7$, $K_2B_4O_7$, $MgB_4O_7$, $CaB_4O_7$, $Na_3AlF_6$, $K_3AlF_6$, $Mg_3(AlF_6)_2$, $Ca_3(AlF_6)_2$, $Na_2SiF_6$, $K_2SiF_6$, $MgSiF_6$, $CaSiF_6$, $Na_2TiF_6$, $K_2TiF_6$, $MgTiF_6$, $CaTiF_6$, $NaPF_6$, $KPF_6$, $Mg(PF_6)_2$, $Ca(PF_6)_2$, $NaBF_4$, $KBF_4$, $Mg(BF_4)_2$ and $Ca(BF_4)_2$.

The amount of inorganic metal salt (C) used in the resin composition is from 0.0005 to 5 parts by weight, preferably from 0.001 to 2 parts by weight, more preferably from 0.005 to 1 part by weight, relative to 100 parts by weight of resin component (A). When the amount of inorganic metal salt (C) is less than 0.0005 part by weight, the improvement in flame retardancy of the resin composition becomes unsatisfactory. On the other hand, when the amount of inorganic metal salt (C) is more than 5 parts by weight, the heat stability and hydrolysis resistance of the aromatic polycarbonate become lowered and hence the mechanical properties, such as impact resistance, of the resin composition disadvantageously become low. As inorganic metal salt (C), various inorganic alkali metal salts and various inorganic alkaline earth metal salts can be used individually or in combination.

In the present invention, combined use of organopolysiloxane (B) and inorganic metal salt (C) is necessary. When organopolysiloxane (B) alone is added to resin component (A), the improvement in flame retardancy of the resin composition is unsatisfactory, but when both organopolysiloxane (B) and inorganic metal salt (C) are added to resin component (A), the flame retardancy of the resin composition is greatly improved. When inorganic metal salt (C) alone is added to resin component (A), almost no improvement in flame retardancy can be obtained.

The characteristic feature of the present invention resides in that a small amount of inorganic metal salt (C) is used in combination with organopolysiloxane (B) to thereby obtain synergy therebetween for imparting high flame retardancy to an aromatic polycarbonate resin composition containing an inherently flammable styrene polymer. On the other hand, with respect to metal salts of organic sulfonic acids which are widely used as a flame retardant for an aromatic polycarbonate, the studies of the present inventors have revealed that when a metal salt of an organic sulfonic acid is used in combination with organopolysiloxane (B), no synergistic effect can be exhibited by them. Further, the present inventors have also found that, when it is attempted to use a metal salt of an organic sulfonic acid so as to impart a satisfactory level of flame retardancy to a resin composition, the metal salt of an organic sulfonic acid must be used in a large amount.

The mechanism by which an excellent improvement in flame retardancy of the resin composition can be obtained by the combined use of organopolysiloxane (B) and inorganic metal salt (C) has not yet been fully elucidated, but it is presumed as follows.

When an aromatic polycarbonate resin composition containing an organopolysiloxane as a flame retardant is on fire, the resin component, especially the aromatic polycarbonate, is caused to form a char layer, and $SiO_2$ derived from the organopolysiloxane is integrated into the char layer, thus forming a highly flame retardant barrier layer. In this case, it is considered that when a resin having high flammability, such as a styrene resin, is present in the resin component, it is required that the flame retardant barrier layer be formed more quickly and more efficiently to suppress the decomposition of the resin component. It is presumed that inorganic metal salt (C) has the effect to efficiently accelerate the formation of the flame retardant barrier layer by resin component (A) and organopolysiloxane (B).

With respect to the method for producing the flame retardant resin composition of the present invention, there is no particular limitation, and conventional methods can be employed. For example, there can be mentioned:

a method in which a resin component (A), an organopolysiloxane (B) and an inorganic metal salt (C) are preliminarily mixed, and the resultant mixture is melt-kneaded at a temperature which is the same as or higher than the softening temperature of the resin component (A);

a method in which a resin component (A) and an inorganic metal salt (C) are preliminarily mixed and then melted, and the resultant molten mixture is mixed with an organopolysiloxane (B);

a method in which an organopolysiloxane (B) and an inorganic metal salt (C) are preliminarily mixed to obtain a (B)/(C) mixture, and, on the other hand, a resin component (A) is melted, and then the (B)/(C) mixture is mixed with the molten form resin component (A); and a method in which a masterbatch is produced by melt-kneading a part of resin component (A) with an organopolysiloxane (B) and an inorganic metal salt (C), and then the masterbatch is added to the remainder of resin component (A).

As examples of methods for conducting the preliminary mixing of the components, there can be mentioned a dry blending method; a method which employs a mixer, such as a Henschel mixer, a super mixer, a tumble mixer, a ribbon blender and the like; and a wet blending method in which a part or whole of each of the components (A) to (C) is individually dissolved in water or a solvent to thereby obtain solutions, and the obtained solutions are mixed together and then dried.

Melt-kneading of the mixture of components can be conducted by means of an extruder, such as a single-screw extruder, a twin-screw extruder, a Banbury mixer and a Brabender.

As a particularly preferred method for producing the flame retardant resin composition of the present invention, there can be mentioned a method in which an inorganic metal salt (C) and an organopolysiloxane (B) are preliminary mixed to obtain a uniform mixture which is comprised of the organopolysiloxane (B) containing the inorganic metal salt (C), and the obtained uniform mixture is mixed with a resin component (A). By the use of this method, the synergistic effect of organopolysiloxane (B) and inorganic metal salt (C) can be easily exhibited and highly improved flame retardancy can be imparted to the resin composition.

As examples of methods for uniformly mixing inorganic metal salt (C) with organopolysiloxane (B), there can be mentioned:

a method in which an organopolysiloxane (B) is heated to a temperature which is the same as or higher than its softening temperature, and an inorganic metal salt (C) is added thereto, followed by melt-kneading of the resultant mixture;

a method in which an organopolysiloxane (B) and an inorganic metal salt (C) are individually dissolved in solvents (wherein the solvent for dissolving organopolysiloxane (B) and the solvent for dissolving inorganic metal salt (C) may be the same or different) to thereby obtain solutions, and the obtained solutions are mixed together, followed by drying to remove the solvents; and a method in which organopolysiloxane (B) is produced by substantially the same method as described above, and a purification treatment which is conventionally performed for removing salts (i.e., by-produced salts formed between an acidic or basic catalyst and a base or acid used for neutralization of the acidic or basic catalyst) is omitted and, thus, an organopolysiloxane containing inorganic metal salts is recovered.

Of these methods, especially preferred is the method in which the salts by-produced during the production of organopolysiloxane (B) are used as inorganic metal salt (C), because inorganic metal salt (C) can be uniformly dispersed in organopolysiloxane (B) at a low cost.

For example, in the method for producing MQ resin wherein the method is disclosed in Examined Japanese Patent Application Publication No. Hei 8-22921 (corresponding to U.S. Pat. No. 5,548,053), alkoxysilanes used as raw materials are reacted in two steps, namely a polycondensation operation using an acidic catalyst (step 1) and a polycondensation operation using a basic catalyst (step 2), and then subjected to a neutralization operation (step 3) for neutralizing the basic catalyst with an acid, thereby obtaining MQ resin. In this case, MQ resin containing NaCl can be obtained by using HCl as an acid in steps 1 and 3 and using NaOH as a base in step 2. MQ resin obtained in the above mentioned manner can be advantageously used in the present invention as organopolysiloxane (B) containing inorganic metal salt (C).

When inorganic metal salt (C) is contained in any of the resin composition of the present invention and organopolysiloxane (B), the amount of inorganic metal salt (C) therein can be determined by conventional methods. For example, an element to be measured for determining the amount of inorganic metal salt (C) can be recovered from the resin composition or organopolysiloxane by, for example, a method in which the resin composition or organopolysiloxane is dissolved in a solvent, and then the desired element is extracted by using water or the like; or a method in which the resin composition or organopolysiloxane is decomposed at a high temperature in the presence or absence of an acid or peroxide, and then the desired element is extracted by using a solvent. Next, the amount of the recovered element can be measured by, for example, coulometric titration, atomic absorption spectroscopy, emission spectrochemical analysis, ion chromatography or fluorescence X-ray analysis. In addition, the amount of inorganic metal salt (C) contained in any of the resin composition of the present invention and organopolysiloxane (B) can also be determined by a method in which the resin composition or organopolysiloxane is subjected directly to fluorescence X-ray analysis, and the amounts of the elements are determined by the FP method (Fundamental Parameter method), the calibration curve method or the like.

The resin composition of the present invention may further comprise a flame retardant other than organopolysiloxane (B) and inorganic metal salt (C) to impart a higher level of flame retardancy to the resin composition. For example, there can be used at least one flame retardant selected from the group consisting of (a) phosphate compounds; (b) red phosphorus and inorganic phosphorus compounds, such as ammonium polyphosphate; (c) halogen-containing organic compounds; (d) nitrogen-containing organic compounds, such as melamine, melamine cyanurate, melam, melem and mellon; (e) inorganic metal salts other than alkali metal salts and alkaline earth metal salts, such as zinc borate and zinc stannate; (f) metal oxides, such as antimony oxide, molybdenum oxide, titanium oxide, zirconium oxide and zinc oxide; (g) cyclic or linear phosphazene polymers or oligomers, such as polyphenoxyphosphazene, polytolyloxyphosphazene, polymethoxyphosphazene, polyphenoxy-methoxyphosphazene and polyphenoxytolyloxyphosphazene; and (h) phenolic resins, such as novolak resin and resol resin, which are produced from phenols (such as phenol, cresol, t-butylphenol and phenylphenol) and formaldehyde. Among these flame retardants, phosphate compounds are preferred because their toxicity is relatively low and a lowering of mechanical properties, caused by them, is relatively small.

Examples of phosphate compounds include phosphates, such as trimethyl phosphate, triethyl phosphate, tripropyl phosphate, tributyl phosphate, tripentyl phosphate, trihexyl phosphate, triphenyl phosphate, tritolyl phosphate, trixylyl phosphate, dimethyl ethyl phosphate, methyl dibutyl phosphate, ethyl dipropyl phosphate, hydroxyphenyl diphenyl phosphate; compounds obtained by introducing various substituents into the above-mentioned phosphates; and condensed phosphate compounds represented by the following formula (6):

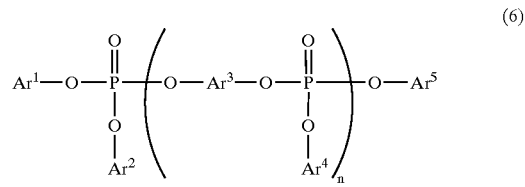

(6)

wherein:

n represents an integer of 1 to 10;

each of $Ar^1$, $Ar^2$, $Ar^4$ and $Ar^5$ independently represents an aromatic group selected from the group consisting of a non-substituted phenyl group and a phenyl group substituted with at least one $C_1$–$C_{10}$ hydrocarbon group; and $Ar^3$ represents a divalent $C_6$–$C_{20}$ aromatic hydrocarbon group.

Examples of condensed phosphate compounds include bisphenol A tetraphenyldiphosphate, bisphenol A tetratolyldiphosphate, bisphenol A tetraxylyldiphosphate, bisphenol A di(phenylxylylphosphate), resorcinol tetraphenyldiphosphate and resorcinol tetraxylyldiphosphate.

In the present invention, a fluoroolefin resin can be used to reduce the amount of flaming particles dripping from an ultimate shaped article when the shaped article is on fire. As the fluoroolefin resins usable in the present invention, there can be mentioned a homopolymer and a copolymer each comprising a fluoroethylene structure. Examples of fluoroolefin resins include a difluoroethylene polymer, a trifluoroethylene polymer, a tetrafluoroethylene polymer, a tetrafluoroethylene-hexafluoropropylene copolymer, and a copolymer of tetrafluoroethylene and an ethylene monomer containing no fluorine. Of these, polytetrafluoroethylene (PTFE) is preferred. With respect to the molecular weight and configuration of the fluoroolefin resin, there is no particular limitation. However, when a fluoroolefin resin is incorporated into the resin composition, it is preferred that the fluoroolefin resin is dispersed in the resin composition in the form of fibrils having a diameter of 0.5 μm or less. The amount of fluoroolefin resin incorporated into the resin composition is in the range of from 0.01 to 3 parts by weight, relative to 100 parts by weight of resin component (A). When the amount of fluoroolefin resin is less than the above-mentioned range, the effect to prevent the dripping of flaming particles becomes unsatisfactory. When the amount of fluoroolefin resin is more than the above-mentioned range, both the melt fluidity and flame retardancy of the resin composition are lowered.

The flame retardant resin composition of the present invention may optionally contain various additives generally used with thermoplastic resins to improve moldability, impact resistance, stiffness, weathering resistance, appearance and the like. Examples of additives include heat stabilizers; antioxidants; ultra-violet light absorbers; weathering resistance agents; antimicrobial agents; compatibility agents; colorants (dyes and pigments); mold release agents; lubricants; antistatic agents; plasticizers; polymers, such as other resins and rubbers; and fillers. With respect to the amount of additives used, there is no particular limitation as long as the additives exhibit no adverse effect on the properties of the flame retardant resin composition of the present invention.

The flame retardant resin composition of the present invention can be advantageously used for producing housings and parts for office automation machines, data communication equipments, electric and electronic appliances and household electric appliances, such as a copier, a facsimile, a television set, a radio, a tape recorder, a video deck, a personal computer, a printer, a telephone, a data terminal equipment, a portable telephone, a refrigerator, a microwave oven and the like. The flame retardant resin composition of the present invention can also be advantageously used for producing parts for an automobile.

BEST MODE FOR CARRYING OUT THE INVENTION

The present invention will be further described in more detail with reference to the following Examples and Comparative Examples, which should not be construed as limiting the scope of the present invention.

In the following Examples and Comparative Examples, the following components were used.

(A) Resin Component (A-1) Aromatic Polycarbonate

PC: A commercially available bisphenol A polycarbonate having a viscosity average molecular weight of 20,000 (trade name: Iupilon S3000, manufactured and sold by Mitsubishi Engineering-Plastics Corporation, Japan) was used.

(A-2) Styrene Polymer

AS: A commercially available acrylonitrile/styrene copolymer (trade name: Stylac AS T8801, manufactured and sold by Asahi Chemical Co., Ltd., Japan) was used.

ABS: A commercially available powdery acrylonitrile/butadiene/styrene copolymer (trade name: RV, manufactured and sold by Mitsubishi Rayon Co., Ltd., Japan) was used.

(B) Organopolysiloxane

S-1 and S-8 to S-15: Each of S-1 and S-8 to S-15 was synthesized from an appropriate ethoxysilane in accordance with the method disclosed in Examined Japanese Patent Application Publication No. Hei 8-22921 by using an acidic catalyst (HCl) and a basic catalyst (NaOH).

S-2 and S-3: Each of S-2 and S-3 was synthesized from an appropriate chlorosilane by a hydrolysis-condensation polymerization.

S-4: S-4 was synthesized by a method in which an organopolysiloxane containing 100 mol % of T unit is produced by a hydrolysis-condensation polymerization of a chlorosilane, and then the organopolysiloxane is reacted with hexamethyldisilazane to thereby introduce M units into the organopolysiloxane.

S-5: A commercially available organopolysiloxane (trade name: PMM0021, manufactured and sold by Gelest, Inc., U.S.A.) was used.

S-6: S-6 was synthesized from an appropriate ethoxysilane in accordance with the method disclosed in Examined Japanese Patent Application Publication No. Hei 8-22921 by using an acidic catalyst (HCl) and a basic catalyst (NaOH).

S-7: S-7 was synthesized in substantially the same manner as in the synthesis of S-6 except that only the acidic catalyst (HCl) was used (i.e., no basic catalyst (NaOH) was used).

S-16: A commercially available organopolysiloxane (trade name: LS-8730, manufactured and sold by Shin-Etsu Chemical Co., Ltd., Japan) was used.

With respect to organopolysiloxane (B), the molar ratios between the M unit, D unit, T unit and Q unit and the structure of the siloxane units contained were confirmed by proton and silicon 29 nuclear magnetic resonance (1H- and $^{29}$Si-NMR) spectroscopy. $^1$H- and $^{29}$Si-NMR spectra were obtained by using deuterated benzene as a solvent and a nuclear magnetic resonance apparatus (trade name: Avance DPX 400 or DPX 300, manufactured and sold by Brucker Instruments Inc., Germany), or by using deuterated chloroform as a solvent and a nuclear magnetic resonance apparatus (trade name: JNM-α400, manufactured and sold by JEOL LTD., Japan).

The weight average molecular weight of organopolysiloxane (B) was obtained by gel permeation chromatography (GPC), using a calibration curve obtained with respect to standard monodisperse polystyrene samples. GPC was carried out under the following "conditions 1" or "conditions 2".

(Conditions 1)

Apparatus: Chromatograph (trade name: Model 307, manufactured and sold by ABIMED Analysen-Technik GmbH, Germany)

Column: Pl gel mixed-c and 100A (both manufactured and sold by Hewlett-Packard, U.S.A.) were used in such form as connected in series.

Eluent: Toluene or tetrahydrofuran

Detection: Differential refractive index detector (trade name: Model 8120, manufactured and sold by BISCHOFF Analysentechnik und-geräte GmbH, Germany)

(Conditions 2)

Apparatus: Chromatograph (trade name: Model LC-10, manufactured and sold by Shimadzu Corporation, Japan)

Column: Shodex K-806M, K-804 and K-802.5 (all manufactured and sold by Showa Denko Co., Ltd., Japan) were used in such form as connected in series.

Eluent: Chloroform

Detection: Ultraviolet absorption detector (trade name: Model SPD-10A, manufactured and sold by Shimadzu Corporation, Japan).

Organopolysiloxane (B) contains, as a reactive terminal group, a hydroxyl group (a silanol group) and/or an ethoxy group (a terminal ethoxy group) which are/is directly bonded to a silicon atom. The contents of these terminal groups were obtained as follows.

(1) The Silanol Group Content (% By Weight):

It was obtained from the volume of methane generated when organopolysiloxane (B) was reacted with methylmagnesium iodide (MeMgI, Grignard reagent) in anhydrous xylene.

(2) The Terminal Ethoxy Group Content (% By Weight):

It was obtained from the signal integral ratio of the $^1$H-NMR spectrum, using tetrachloroethane or dichloromethane as an internal standard substance. The $^1$H-NMR spectrum was obtained under substantially the same conditions as mentioned above.

The content of inorganic metal salt (C) in organopolysiloxane (B) was determined by fluorescence X-ray analysis or flameless atomic absorption spectrometry. Fluorescence X-ray analysis was conducted using a fluorescence X-ray analyzer (trade name: RIX3000 fluorescence X-ray analyzer, manufactured and sold by Rigaku Corporation, Japan) which employs the FP (Fundamental Parameter) method. Flameless atomic absorption spectrometry was conducted by a method in which the organopolysiloxane is pre-treated with sulfuric acid and hydrofluoric acid, and the resultant product is analyzed using a flameless atomic absorption spectrometer (trade name: Z-8270, manufactured and sold by Hitachi, Ltd., Japan).

Inorganic metal salts were not detected in organopolysiloxanes S-1 to S-5, S-7 and S-16. However, NaCl derived from each of the catalysts used for synthesizing organopolysiloxanes was detected in the other organosiloxanes (S-6 and S-8 to S-15).

The properties of organopolysiloxanes (B) which were determined by the above-mentioned methods are shown in Table 1.

Further, in Comparative Examples 3 and 5 to 8, the below-mentioned metal salts of organic sulfonic acids were used instead of inorganic metal salt (C).

F114P: A commercially available potassium perfluorobutanesulfonate (trade name: MEGAFAC F114P, manufactured and sold by DAINIPPON INK & CHEMICALS INC., Japan) was used.

KSS: A commercially available potassium diphenylsulfon-3-sulfonate (manufactured and sold by UCB Japan, Japan) was used.

EXAMPLES 1 to 6

Polycarbonate resin compositions were produced in accordance with the formulations shown in Table 2. Specifically, first, an aqueous solution or methanol solution of inorganic metal salt (C) was mixed with an aromatic polycarbonate, followed by drying at 120° C. for 4 hours to thereby obtain a mixture of an aromatic polycarbonate and an inorganic metal salt. The obtained mixture, a styrene polymer and organopolysiloxane (B) were placed in a polyethylene bag and preliminarily mixed together by hand and, then, melt-kneaded at 250° C. using an extruder (trade name: KZW15-45MG, manufactured and sold by Technovel Corporation, Japan), thereby obtaining a resin composition (in the form of pellets). The obtained resin composition was subjected to injection molding at a temperature of 250° C. by means of a small size injection molding machine (trade name: MJEC10, manufactured and sold by Modern Machinery Company, Japan) to thereby obtain a test sample having a thickness of 3.18 mm.

Using the test sample, the self-extinguishing properties of the resin composition were evaluated in accordance with the Vertical Burning Method which is described in UL-94. The results are shown in Table 2.

As is apparent from Table 2, each of the resin compositions of the present invention exhibits excellent flame retardancy (self-extinguishing properties) and exhibits no dripping of flaming particles, in spite of the fact that the resin component thereof is a resin mixture of an aromatic polycarbonate and an inherently flammable styrene polymer.

Comparative Example 1

Substantially the same procedure as in Examples 1 to 6 was repeated except that a test sample was prepared using a resin composition composed only of an aromatic polycarbonate and a styrene polymer (i.e., without using an organopolysiloxane and an inorganic metal salt). The results are shown in Table 2.

As is apparent from Table 2, dripping of flaming particles was observed and the flame-out time was long.

Comparative Example 2

Substantially the same procedure as in Examples 1 to 6 was repeated except that a test sample was prepared using a resin composition composed only of an aromatic polycarbonate, a styrene polymer and an organopolysiloxane (i.e., without using an inorganic metal salt). The results are shown in Table 2.

As is apparent from Table 2, dripping of flaming particles was observed and the flame-out time was long. From this fact, it is understood that, when an organopolysiloxane is used alone, the effect thereof to impart flame retardancy to the resin composition is unsatisfactory.

Comparative Examples 3 and 4

Substantially the same procedure as in Examples 1 to 6 was repeated except that a test sample was prepared using a resin composition composed only of an aromatic polycarbonate, a styrene polymer and either a metal salt of an organic sulfonic acid (F114P) or an inorganic metal salt (NaCl) (i.e., without using an organopolysiloxane). The results are shown in Table 2.

As is apparent from Table 2, in each of Comparative Examples 3 and 4, dripping of flaming particles was observed and the flame-out time was long. From this fact, it is understood that, when the metal salt is used alone, the effect thereof to impart flame retardancy to the resin composition is unsatisfactory.

Comparative Examples 5 to 8

Substantially the same procedure as in Examples 1 to 6 was repeated except that a test sample was prepared using a metal salt of an organic sulfonic acid (F114P or KSS) instead of an inorganic metal salt (C). The results are shown in Table 2.

As is apparent from Table 2, a metal salt of an organic sulfonic acid exhibited no effect of imparting flame retardancy to the resin composition comprising an aromatic polycarbonate and an inherently flammable styrene polymer. Further, in any of Comparative Examples 5 to 8, the flame-out time was longer than the flame-out time in Comparative Example 1.

From the results of Examples 1 to 6 and Comparative Examples 1 to 8, it is understood that excellent flame retardancy can be imparted to a resin composition comprising an aromatic polycarbonate and an inherently flammable styrene polymer only by the combined use of an organopolysiloxane and an inorganic metal salt, and that such excellent effect can be obtained even when the amount of the inorganic metal salt is small. It is also understood that a metal salt of an organic sulfonic acid, which is a conventional flame retardant, exhibits no effect of imparting flame retardancy to a resin composition comprising an aromatic polycarbonate and an inherently flammable styrene polymer.

Examples 7 to 11

Polycarbonate resin compositions were produced using respectively organopolysiloxanes S-2 to S-5, which have different structures. In Examples 7 to 8 and 10, test samples were produced in substantially the same manner as in Examples 1 to 6 except that the formulations shown in Table 3 were used. In Examples 9 and 11, test samples were produced in substantially the same manner as in Examples 1 to 6 except that the formulations shown in Table 3 were used and that the resin compositions (in the form of pellets) were subjected to compression molding at a temperature of 250° C. using a compression molding machine to thereby obtain test samples having a thickness of 3.18 mm. The evaluation of the self-extinguishing properties of the test samples was conducted in the same manner as in Examples 1 to 6. The results are shown in Table 3.

As is apparent from Table 3, the resin compositions of the present invention exhibit excellent flame retardancy irrespective of the structure of the organopolysiloxanes used.

Comparative Example 9 to 12

Substantially the same procedure as in Examples 1 to 6 was repeated except that organopolysiloxanes S-2 to S-5 (the same organopolysiloxanes as used in Examples 7 to 11) were, respectively, used as organopolysiloxanes (B) and an inorganic metal salt was not used. The results are shown in Table 3.

As is apparent from Table 3, in each of Comparative Examples 9 to 12, dripping of flaming particles was observed and the flame-out time was long. From the this fact, it is understood that the combined use of an organopolysiloxane and an inorganic metal salt is necessary for preventing the dripping of flaming particles and for achieving a short flame-out time.

Examples 12 to 16

Polycarbonate resin compositions were produced using respectively organopolysiloxanes S-6, S-8, S-10, S-12 and S-14, which contain NaCl derived from the catalysts used for synthesizing the organopolysiloxanes. In accordance with the formulations shown in Table 4, an aromatic polycarbonate, a styrene polymer and an organopolysiloxane were preliminarily mixed together, and preparation of test samples and evaluation of the self-extinguishing properties were conducted in the same manner as in Examples 1 to 6. No inorganic metal salt was added from the outside to the resin composition, and only the NaCl contained in the organopolysiloxane was used as inorganic metal salt (C). The results are shown in Table 4.

As is apparent from Table 4, the resin compositions of the present invention exhibit excellent flame retardancy in spite of the fact that no inorganic metal salt was added from the outside to the resin composition.

Comparative Examples 13 to 16

There were used individually organopolysiloxanes S-7, S-9, S-11 and S-13, which respectively have the same or substantially the same structures as those of organopolysiloxanes S-6, S-8, S-10 and S-12 (which are used in Examples 12 to 15), but which have low inorganic metal salt contents. In accordance with the formulations shown in Table 4, an aromatic polycarbonate, a styrene polymer and an organopolysiloxane were preliminarily mixed together, and preparation of test samples and evaluation of the self-extinguishing properties were conducted in the same manner as in Examples 1 to 6. No inorganic metal salt was added from the outside to the resin composition, and only the NaCl contained in the organopolysiloxaneone was used as inorganic metal salt (C). The results are shown in Table 4.

As is apparent from Table 4, in each of Comparative Examples 13 to 16, dripping of flaming particles was observed and the flame-out time was long. From this fact, it is understood that the flame retardancy imparting effect becomes poor when the content of the inorganic metal salt (C) is less than 0.0005 part by weight, relative to 100 parts by weight of the resin component.

Comparative Examples 17 and 18

In Comparative Example 17, a high molecular weight MQ resin (S-15) containing 65 mol % of Q unit was used as organopolysiloxane (B). In accordance with the formulation shown in Table 4, an aromatic polycarbonate, a styrene polymer and an organopolysiloxane were preliminarily mixed together, and preparation of a test sample and evaluation of the self-extinguishing properties were conducted in the same manner as in Examples 1 to 6. Since S-15 contained NaCl derived from the catalyst used for synthesizing S-15, no inorganic metal salt was added from the outside to the resin composition.

In Comparative Example 18, a low molecular weight silicone compound (S-16) containing 75 mol % of M unit was used as organopolysiloxane (B). Since S-16 contained no inorganic metal salt, NaCl was added from the outside to the resin composition in the same manner as in Examples 1 to 6, and preparation of a test sample and evaluation of the self-extinguishing properties were conducted in the same manner as in Examples 1 to 6. The results are shown in Table 4.

As is apparent from Table 4, in each of Comparative Examples 17 and 18, dripping of flaming particles was observed and the flame-out time was long. From this fact, it is understood that, when the organopolysiloxane used in combination with inorganic metal salt (C) has high Q unit content or high M unit content, the flame retardancy imparting effect becomes poor.

TABLE 1

| No. | Organopolysiloxane (B) Structure and Composition* | | Weight average molecular weight | Reactive terminal group content | | Inorganic metal salt content (wt %) |
|---|---|---|---|---|---|---|
| | | | | OEt (wt %) | OH (wt %) | |
| S-1 | MQ | $(Me_3SiO_{0.5})_{0.4}(SiO_2)_{0.6}$ | 9,400 | 3.2 | 0.7 | not detected |
| S-2 | DT | $(PhMeSiO)_{0.2}(PhSiO_{1.5})_{0.52}(MeSiO_{1.5})_{0.28}$ | 2,500 | 0.3 | 2.8 | not detected |
| S-3 | T | $(PhSiO_{1.5})_{0.33}(n\text{-}PrSiO_{1.5})_{0.67}$ | 3,760 | <0.5 | 3.0 | not detected |
| S-4 | MT | $(PhSiO_{1.5})_{0.53}(n\text{-}PrSiO_{1.5})_{0.26}(Me_3SiO_{0.5})_{0.21}$ | 2,500 | <0.5 | <0.1 | not detected |
| S-5 | MD | $Me_3SiO(PhMeSiO)_nSiMe_3$ | 1,640 | 0 | 0 | not detected |
| S-6 | DTQ | $(PhMeSiO)_{0.2}(PhSiO_{1.5})_{0.6}(SiO_2)_{0.2}$ | 2,300 | 16.0 | <0.1 | 0.102 (NaCl) |
| S-7 | DTQ | $(PhMeSiO)_{0.2}(PhSiO_{1.5})_{0.6}(SiO_2)_{0.2}$ | 970 | 18.9 | 0.92 | not detected |
| S-8 | MTQ | $(Me_3SiO_{0.5})_{0.38}(PhSiO_{1.5})_{0.05}(SiO_2)_{0.57}$ | 8,800 | 4.0 | 0.3 | 0.203 (NaCl) |
| S-9 | MTQ | $(Me_3SiO_{0.5})_{0.35}(PhSiO_{1.5})_{0.13}(SiO_2)_{0.52}$ | 7,440 | 5.3 | 0.4 | 0.001 (NaCl) |
| S-10 | MTQ | $(Me_3SiO_{0.5})_{0.35}(n\text{-}PrSiO_{1.5})_{0.13}(SiO_2)_{0.52}$ | 8,540 | 7.1 | <0.1 | 0.153 (NaCl) |
| S-11 | MTQ | $(Me_3SiO_{0.5})_{0.35}(n\text{-}PrSiO_{1.5})_{0.13}(SiO_2)_{0.52}$ | 8,880 | 6.6 | 0.4 | 0.004 (NaCl) |
| S-12 | MTQ | $(Me_3SiO_{0.5})_{0.35}(\text{iso-}OctSiO_{1.5})_{0.13}(SiO_2)_{0.52}$ | 10,100 | 4.3 | 0.4 | 0.124 (NaCl) |
| S-13 | MTQ | $(Me_3SiO_{0.5})_{0.35}(\text{iso-}OctSiO_{1.5})_{0.13}(SiO_2)_{0.52}$ | 10,100 | 4.3 | 0.4 | 0.003 (NaCl) |
| S-14 | MDQ | $(Me_3SiO_{0.5})_{0.31}(Me_2SiO)_{0.21}(SiO_2)_{0.48}$ | 15,600 | 2.5 | 0.2 | 0.073 (NaCl) |
| S-15 | MQ | $(Me_3SiO_{0.5})_{0.35}(SiO_2)_{0.65}$ | 115,000 | 4.6 | 0.2 | 0.142 (NaCl) |
| S-16 | MT | $(Me_3SiO)_3SiPh$ | 372 | 0 | 0 | not detected |

*Me, Ph, n-Pr and iso-Oct represent a methyl group, a phenyl group, an n-propyl group and an isooctyl group, respectively.

TABLE 2

| | Formulation (parts by weight) | | | | | Evaluation according to UL-94 | | | |
|---|---|---|---|---|---|---|---|---|---|
| | Resin Component (A) | | | Organo-poly-siloxane (B) | Inorganic metal salt (C) | Average flame-out time (sec) | Maximum flame-out time (sec) | Number of drippings | Evaluation |
| | PC | AS | ABS | | | | | | |
| Ex. 1 | 80 | 10 | 10 | 11.1 (S-1) | 0.009 (NaCl) | 11.2 | 25 | 0/10 | V-1 |
| Ex. 2 | 80 | 10 | 10 | 11.1 (S-1) | 0.018 (NaCl) | 7.3 | 14 | 0/10 | V-1 |
| Ex. 3 | 80 | 10 | 10 | 11.1 (S-1) | 0.073 (NaCl) | 8.2 | 19 | 0/10 | V-1 |
| Ex. 4 | 80 | 10 | 10 | 11.1 (S-1) | 0.023 (KCl) | 9.0 | 16 | 0/10 | V-1 |
| Ex. 5 | 80 | 10 | 10 | 11.1 (S-1) | 0.032 (NaBr) | 10.8 | 24 | 0/10 | V-1 |
| Ex. 6 | 80 | 10 | 10 | 11.1 (S-1) | 0.027 (NaNO$_3$) | 11.5 | 23 | 0/10 | V-1 |
| Compara. Ex. 1 | 80 | 10 | 10 | 0 | 0 | 30.4 | 41 | 10/10 | Out of the standard |
| Compara. Ex. 2 | 80 | 10 | 10 | 11.1 (S-1) | 0 | 32.3 | 76 | 2/10 | Out of the standard |
| Compara. Ex. 3 | 80 | 10 | 10 | 0 | 0.05 (F114P)* | 44.5 | 87 | 10/10 | Out of the standard |
| Compara. Ex. 4 | 80 | 10 | 10 | 0 | 0.017 (NaCl) | 37.8 | 90 | 10/10 | Out of the standard |
| Compara. Ex. 5 | 80 | 10 | 10 | 11.1 (S-1) | 0.05 (F114P)* | 45.9 | 141 | 8/10 | Out of the standard |
| Compara. Ex. 6 | 80 | 10 | 10 | 11.1 (S-1) | 0.2 (F114P)* | 59.2 | 152 | 10/10 | Out of the standard |
| Compara. Ex. 7 | 80 | 10 | 10 | 11.1 (S-1) | 1.0 (F114P)* | With respect to 3 samples out of the 5 samples, combustion continued until all was burned out. | | | |
| Compara. Ex. 8 | 80 | 10 | 10 | 11.1 (S-1) | 0.05 (KSS)* | 39.2 | 136 | 10/10 | Out of the standard |

*Metal salt of organic sulfonic acid was used instead of inorganic metal salt (C).

TABLE 3

| | Formulation (parts by weight) | | | | | Evaluation according to UL-94 | | | |
|---|---|---|---|---|---|---|---|---|---|
| | Resin Component (A) | | | Organo-poly-siloxane (B) | Inorganic metal salt (C) | Average flame-out time (sec) | Maximum flame-out time (sec) | Number of drippings | Evaluation |
| | PC | AS | ABS | | | | | | |
| Ex. 7 | 80 | 10 | 10 | 11.1 (S-2) | 0.018 (NaCl) | 8.8 | 18 | 0/10 | V-1 |
| Ex. 8 | 80 | 10 | 10 | 11.1 (S-2) | 0.035 (CaCl$_2$) | 9.0 | 15 | 0/10 | V-1 |
| Ex. 9 | 80 | 10 | 10 | 11.1 (S-3) | 0.037 (NaCl) | 5.1 | 11 | 0/10 | V-1 |
| Ex. 10 | 80 | 10 | 10 | 11.1 (S-4) | 0.018 (NaCl) | 4.3 | 9 | 0/10 | V-0 |

TABLE 3-continued

| | Formulation (parts by weight) | | | | | Evaluation according to UL-94 | | | |
|---|---|---|---|---|---|---|---|---|---|
| | Resin Component (A) | | | Organo-polysiloxane | Inorganic metal salt | Average flame-out time | Maximum flame-out time | Number of | |
| | PC | AS | ABS | (B) | (C) | (sec) | (sec) | drippings | Evaluation |
| Ex. 11 | 80 | 10 | 10 | 11.1 (S-5) | 0.018 (NaCl) | 5.8 | 12 | 0/10 | V-1 |
| Compara. Ex. 9 | 80 | 10 | 10 | 11.1 (S-2) | 0 | 20.3 | 95 | 2/10 | Out of the standard |
| Compara. Ex. 10 | 80 | 10 | 10 | 11.1 (S-3) | 0 | 17.3 | 76 | 5/10 | Out of the standard |
| Compara. Ex. 11 | 80 | 10 | 10 | 11.1 (S-4) | 0 | 15.4 | 66 | 2/10 | Out of the standard |
| Compara. Ex. 12 | 80 | 10 | 10 | 11.1 (S-5) | 0 | 8.5 | 19 | 2/10 | Out of the standard |

TABLE 4

| | Formulation (parts by weight) | | | | | Evaluation according to UL-94 | | | |
|---|---|---|---|---|---|---|---|---|---|
| | Resin Component (A) | | | Organo-polysiloxane | Inorganic metal salt*[1] | Average flame-out time | Maximum flame-out time | Number of | |
| | PC | AS | ABS | (B) | (C) | (sec) | (sec) | drippings | Evaluation |
| Ex. 12 | 80 | 10 | 10 | 11.1 (S-6) | 0.011 (NaCl) | 7.2 | 13 | 0/10 | V-1 |
| Compara. Ex. 13 | 80 | 10 | 10 | 11.1 (S-7) | 0 | 35.5 | 101 | 4/10 | Out of the standard |
| Ex. 13 | 80 | 10 | 10 | 5.3 (S-8) | 0.011 (NaCl) | 4.6 | 7 | 0/10 | V-0 |
| Compara. Ex. 14 | 80 | 10 | 10 | 11.1 (S-9) | 0.0001 (NaCl) | 10.8 | 24 | 4/10 | Out of the standard |
| Ex. 14 | 80 | 10 | 10 | 11.1 (S-10) | 0.017 (NaCl) | 5.0 | 7 | 0/10 | V-0 |
| Compara. Ex. 15 | 80 | 10 | 10 | 11.1 (S-11) | 0.0004 (NaCl) | 25.8 | 103 | 0/10 | Out of the standard |
| Ex. 15 | 80 | 10 | 10 | 11.1 (S-12) | 0.014 (NaCl) | 4.9 | 8 | 0/10 | V-0 |
| Compara. Ex. 16 | 80 | 10 | 10 | 11.1 (S-13) | 0.0003 (NaCl) | 42.0 | 104 | 0/10 | Out of the standard |
| Ex. 16 | 80 | 10 | 10 | 11.1 (S-14) | 0.008 (NaCl) | 7.7 | 19 | 0/10 | V-1 |
| Compara. Ex. 17 | 80 | 10 | 10 | 11.1 (S-15) | 0.016 (NaCl) | 17.5 | 91 | 4/10 | Out of the standard |
| Compara. Ex. 18 | 80 | 10 | 10 | 11.1 (S-16) | 0.018 (NaCl)*[2] | 22.6 | 57 | 3/10 | Out of the standard |

*[1]Inorganic metal salt (C) used in Examples 12–16 and Comparative Examples 14–17 was the NaCl contained in organopolysiloxane (B).
*[2]In Compara. Ex. 18, NaCl was added from the outside.

INDUSTRIAL APPLICABILITY

The flame retardant aromatic polycarbonate resin composition of the present invention, which contains a flame retardant comprising a combination of an organopolysiloxane and an inorganic metal salt, exhibits high flame retardancy in spite of the fact that the resin composition contains an inherently flammable styrene polymer. Accordingly, the resin composition of the present invention can be satisfactorily used as a material for various parts which have been becoming large and thin, such as parts for office automation machines, data communication equipments, electric and electronic appliances, household electric appliances and automobiles. Therefore, the application field for the resin composition of the present invention is expected to be expanded.

It is claimed:

1. A flame retardant resin composition comprising:
   100 parts by weight of a resin component (A) which is a resin mixture of an aromatic polycarbonate and a styrene polymer, wherein said resin mixture has an aromatic polycarbonate content of from 50 to 95% by weight and a styrene polymer content of from 5 to 50% by weight,
   0.1 to 30 parts by weight of an organopolysiloxane (B), and 0.0005 to 5 parts by weight of at least one inorganic metal salt (C) selected from the group consisting of an alkali metal salt of nitric acid, an alkaline earth metal salt of nitric acid, an alkali metal halide and an alkaline earth metal halide,
   said organopolysiloxane (B) comprising: 0 to 70 mol % of a monofunctional siloxane unit (M unit) represented by the following formula (1):

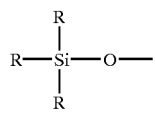

(1)

wherein each R independently represents a monovalent organic group selected from the group consisting of a monovalent $C_1$–$C_{20}$ hydrocarbon group, a monovalent $C_1$–$C_{20}$ halogenated hydrocarbon group, a $C_1$–$C_{20}$ mercaptoalkyl group, a $C_2$–$C_{20}$ cyanoalkyl group, a $C_2$–$C_{20}$ acyloxyalkyl group, a $C_1$–$C_{20}$ aminoalkyl group, a $C_6$–$C_{20}$ aminoaryl group, a $C_1$–$C_{20}$ hydroxyalkyl group, and a $C_4$–$C_{20}$ glycidoxyalkyl group;

0 to 100 mol % of a bifunctional recurring siloxane unit (D unit) represented by the following formula (2):

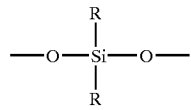

(2)

wherein each R is as defined above for formula (1); 0 to 100 mol % of a trifunctional recurring siloxane unit (T unit) represented by the following formula (3):

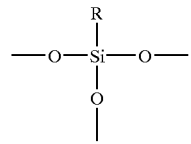

(3)

wherein R is as defined above for formula (1); and 0 to 63 mol % of a tetrafunctional recurring siloxane unit (Q unit) represented by the following formula (4):

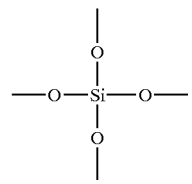

(4)

wherein each mol % is based on the total molar amount of said M unit said D unit, said T unit and said Q unit.

2. The composition according to claim 1, wherein each R in said formulae (1), (2) and (3) is independently selected from the group consisting of a methyl group, an ethyl group, an n-propyl group, an isopropyl group, an isooctyl group, a vinyl group and a phenyl group.

3. The composition according to claim 1 or 2, wherein said alkali metal halide is at least one compound selected from the group consisting of NaCl, KCl, NaBr and KBr.

* * * * *